(12) United States Patent
Jung

(10) Patent No.: US 12,633,719 B2
(45) Date of Patent: May 19, 2026

(54) LASER BEAM DEVICE WITH COUPLING OF AN ILLUMINATING LASER BEAM INTO AN EFFECTIVE LASER BEAM

(71) Applicant: Rheinmetall Waffe Munition GmbH, Südheide (DE)

(72) Inventor: Markus Jung, Eicklingen (DE)

(73) Assignee: Rheinmetall Waffe Munition GmbH, Südheide (DE)

( * ) Notice: Subject to any disclaimer, the term of this patent is extended or adjusted under 35 U.S.C. 154(b) by 755 days.

(21) Appl. No.: 18/086,983

(22) Filed: Dec. 22, 2022

(65) Prior Publication Data

US 2023/0130871 A1     Apr. 27, 2023

Related U.S. Application Data

(63) Continuation of application No. PCT/EP2021/067478, filed on Jun. 25, 2021.

(30) Foreign Application Priority Data

Jun. 26, 2020     (DE) ..................... 10 2020 003 944.8

(51) Int. Cl.
*H01S 3/23*          (2006.01)
*F41H 13/00*        (2006.01)
*H01S 3/00*          (2006.01)

(52) U.S. Cl.
CPC ......... *H01S 3/2391* (2013.01); *F41H 13/005* (2013.01); *H01S 3/0071* (2013.01)

(58) Field of Classification Search
CPC ...... H01S 3/2391; H01S 3/0071; H01S 3/005; H01S 3/0014; H01S 3/2383;
(Continued)

(56) References Cited

U.S. PATENT DOCUMENTS 4,395,616 A  *  7/1983  Smith ................. F41H 13/0062
                                                                219/121.76
6,134,050 A     10/2000  Conemac
                        (Continued)

FOREIGN PATENT DOCUMENTS

DE          692 32 640 T2      2/2003
DE     10 2006 023 321 A1    11/2007
                        (Continued)

OTHER PUBLICATIONS

International Search Report from corresponding PCT Application No. PCT/EP2021/067478, dated Oct. 7, 2021.
(Continued)

*Primary Examiner* — James C. Jones
(74) *Attorney, Agent, or Firm* — Harness, Dickey & Pierce, P.L.C.

(57)          ABSTRACT

The invention relates to a laser beam device for generating an effective laser beam and an illuminating laser beam, having a coupling element for coupling the illuminating laser beam into a beam path of the effective laser beam. The laser beam device is characterized in that the coupling element has a first sub-region and a second sub-region that is different from the first sub-region, and the effective laser beam, the illuminating laser beam and the coupling element are arranged relative to one another such that the effective laser beam is directed onto the first sub-region and the illuminating laser beam is directed onto the second sub-region, the first sub-region being transparent to the effective laser beam and the second sub-region being designed to reflect the illuminating laser beam in parallel with the effective laser beam.

16 Claims, 5 Drawing Sheets

(58) Field of Classification Search
CPC ....... F41H 13/005; G02B 27/10; G02B 5/005;
G02B 7/24; G02B 27/0988; G02B
27/0905; G01S 7/4815; G01S 17/66
See application file for complete search history.

(56) References Cited

U.S. PATENT DOCUMENTS

| | | |
|---|---|---|
| 8,218,589 B1 | 7/2012 | Saunders |
| 2018/0210081 A1 | 7/2018 | Haag et al. |

FOREIGN PATENT DOCUMENTS

| | | |
|---|---|---|
| DE | 10 2018 100 891 A1 | 7/2019 |
| WO | WO-97/40405 A1 | 10/1997 |
| WO | WO-2013/165548 A2 | 11/2013 |

OTHER PUBLICATIONS

Written Opinion from corresponding PCT Application No. PCT/EP2021/067478, dated Oct. 7, 2021.
Office Action from corresponding German Patent Application No. 10 2020 003 944.8, dated Feb. 23, 2021.

* cited by examiner

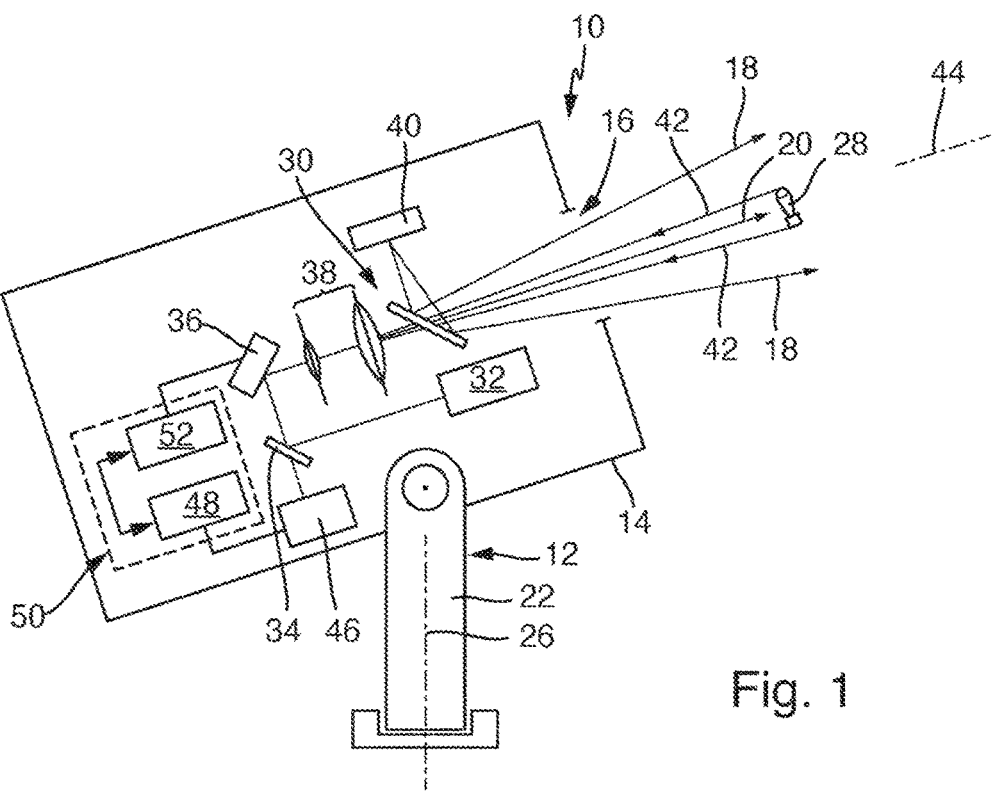
Fig. 1
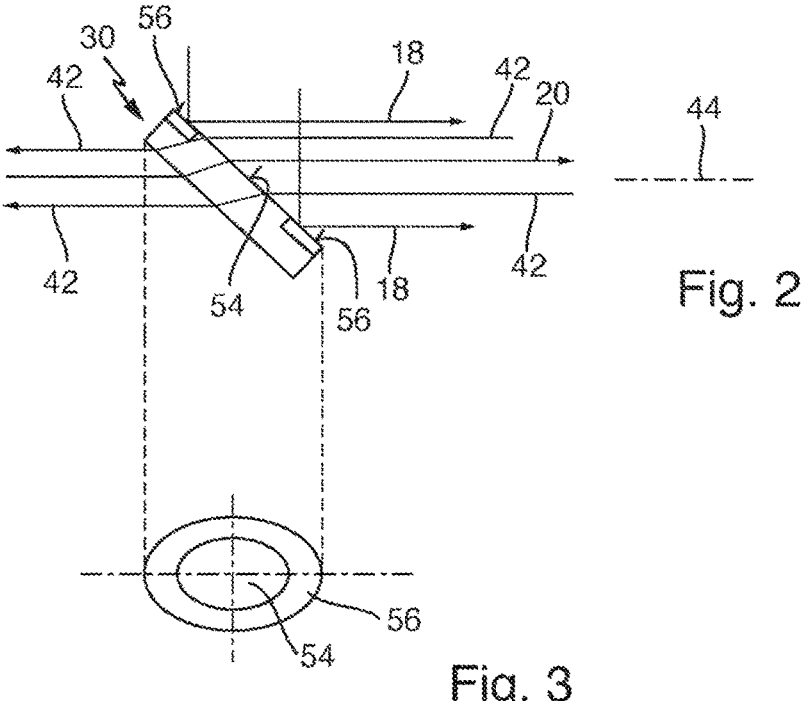
Fig. 2
Fig. 3

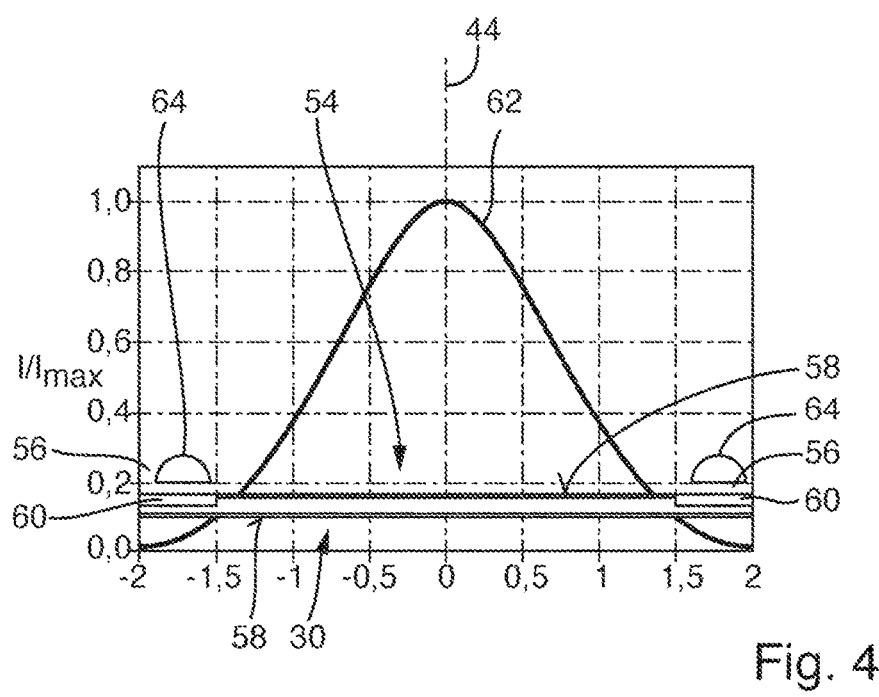
Fig. 4
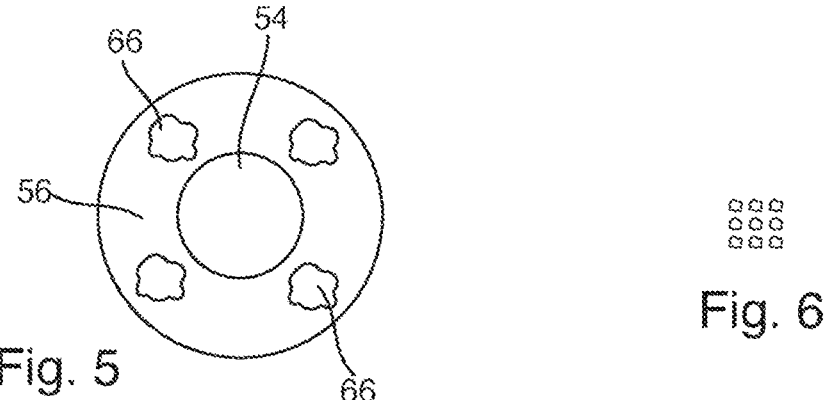
Fig. 5
Fig. 6
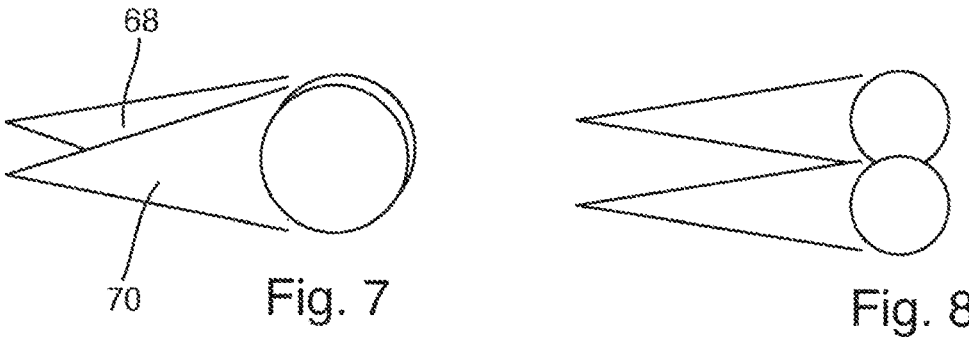
Fig. 7
Fig. 8

LASER BEAM DEVICE WITH COUPLING OF AN ILLUMINATING LASER BEAM INTO AN EFFECTIVE LASER BEAM

CROSS-REFERENCE TO RELATED APPLICATIONS

This application is a continuation application of PCT Application No. PCT/EP2021/067478, filed on 25 Jun. 2021, which claims the benefit and priority to German Patent Application No. 10 2020 003 944.8, filed on 26 Jun. 2020. The entire disclosures of the applications identified in this paragraph are incorporated herein by references.

FIELD

The present invention relates to a laser beam device according to the preamble of claim 1. Such a laser beam device is assumed to be known per se and comprises means for generating an effective laser beam originating from the laser beam device, means for generating an illuminating laser beam, and a coupling element for coupling the illuminating laser beam into a beam path of the effective laser beam to be emitted by the laser beam device.

BACKGROUND

The effective laser beam is used to engage targets by means of thermal or non-thermal interference (dazzling), damage or destruction. Examples of such targets are static targets such as mines and dynamic targets such as missiles or artillery shells (UAVs, etc.). The laser beam device is usually aligned in two steps. In a first step, the target is detected, for example, by an electro-optical system, e.g. a radar system, and the laser beam device is mechanically aligned with the target in a relatively rough manner (rough tracking). The alignment is performed, for example, by azimuthally rotating a platform (tower) supporting the laser beam device and by pivoting the laser beam device, which can be pivoted relative to the platform, on the platform in the direction of elevation. In a second step, the target is illuminated by an illuminating laser beam (fine tracking). The illuminating radiation reflected by the illuminated target is detected by a sensor designed to detect the illuminating radiation, evaluated, and used for the fine alignment of the effective laser beam by adjusting a mirror influencing the direction of the effective laser beam.

The means for generating the illuminating laser beam can basically be realized in three different arrangements, each of which is fraught with different problems.

SUMMARY

In a first arrangement referred to as a remote illuminating laser, a second rotatable platform is required which must be electrically coupled to the platform of the means for generating the effective laser beam with high mechanical accuracy, and which supports the means for generating the illuminating laser beam. What is disadvantageous as well is the existence of coverage areas where the target is obscured by the means for generating the effective laser beam or, conversely, the target for the effective laser beam is obscured by the means for generating the illuminating laser beam.

In a second arrangement referred to as an axis-parallel illuminating laser, the illuminating laser, having a telescope, is mechanically coupled with parts of its telescope parallel to the beam path of the effective laser beam to the means for generating the effective laser beam. This results in a lateral offset of the two laser beams so that the illuminating laser beam does not coincide with the effective laser beam in the far field, which limits the fine tracking range, i.e., the range that extends perpendicularly to the illuminating laser beam and can be illuminated with the illuminating laser beam. This lateral offset can be compensated for by a larger beam angle of the illuminating laser beam, but this requires a disadvantageously greater transmission power of the illuminating laser beam and/or small axial distances.

In a third arrangement, the illuminating laser beam is coupled into the beam path of the effective laser beam. For this purpose, a coupling element is used that has, firstly, a high transmission for the wavelength of the effective laser beam, secondly, a high temperature resistance that is sufficient for the high power of the effective laser beam, thirdly, a high reflection for the illuminating laser beam in the transmission direction (toward the target), and, fourthly, a high transmission for the illuminating laser beam in the reflection direction (from the target to a sensor sensitive to the illuminating radiation).

The fourth requirement can be satisfied by using an optical element with a polarization-dependent reflection for the wavelength of the illuminating laser beam and by using polarized illuminating laser radiation. In the transmission direction, the reflection is maximized in the polarization direction of the illuminating laser radiation. In the reflection direction (from the target to the sensor), only the radiation of the target reflected perpendicularly to the polarization of the illuminating laser radiation is transmitted. This means that a large part of the reflected radiation is not used. This can be disadvantageously compensated for only by a higher power of the illuminating laser beam.

Alternatively, the fourth requirement can be satisfied by using a coupling element with 50% reflection and 50% transmission for the wavelength of the illuminating laser beam. Thus, only about 50% of the power of the illuminating laser beam arrives at the target. In the reflection direction, only 50% is transmitted from the coupling element to the sensor. Consequently, the sensor receives less than 25% of the power compared to the remote, or laterally offset, means for generating the illuminating laser beam. This can be disadvantageously compensated for only by a higher power of the illuminating laser beam.

The present invention is based on the third arrangement and is characterized in that the coupling element has a first sub-region and a second sub-region that is different from the first sub-region and in that the means for generating the effective laser beam, the means for generating the illuminating laser beam, and the coupling element are arranged relative to one another in a certain manner. According to this certain manner, the effective laser beam is directed onto the first sub-region, and the illuminating laser beam is directed onto the second sub-region. The first sub-region is transparent to the effective laser beam, and the second sub-region is designed to reflect the illuminating laser beam in parallel with the effective laser beam.

These features lead to the advantage of a high accuracy of the alignment that results from the third arrangement without incurring the performance losses described above.

Another advantage is that the above-mentioned performance losses do not occur with the present invention, or at the most occur to a much lesser extent.

It is also advantageous that this does not involve any reduction in the aperture diameter of the effective laser beam relative to the aperture diameter of the aiming system.

The invention also allows the use of more than one illuminating laser beam, wherein different illuminating laser beams can have different wavelengths and beam diameters in the target plane.

A preferred embodiment is characterized in that the wavelength of the effective laser beam differs from the wavelength of the illuminating laser beam. This way, for example, the sub-region that is intended to reflect the illuminating laser beam can be made transparent to the effective laser beam (e.g., by means of corresponding reflection layers AR/AR for the effective laser as a whole, AR/R only for the region of the transmitting branch illuminating laser AR/AR illuminating laser for the receiving region, with R standing for reflective and AR for anti-reflective). This way, it is possible to prevent the effective laser beam from being reflected in an undesirable manner and vagabonding in the laser beam device.

It is also preferred that the first sub-region is a central sub-region with regard to the beam cross section of the effective laser beam. Thus, the first sub-region coincides with the central region of the beam cross section, where the highest power density of the effective laser beam is found. This ensures that as much of the generated effective laser radiation as possible can also be emitted.

It is also preferred that the second sub-region is a peripheral sub-region, located outside of the central sub-region, with regard to the beam cross section of the effective laser beam. In a laser beam with, for example, a Gaussian intensity profile, the power density is very low in this sub-region, and thus the influence on the field distribution of the illuminating laser beam is very small.

Another preferred embodiment is characterized by the fact that the coupling element is a plane-parallel plate. A plane-parallel plate allows the illuminating laser beam, which is preferably at a right angle to the beam path of the effective laser beam, to be deflected into the beam path of the effective laser beam with only a minimal influence on the effective laser beam, which experiences only a small lateral offset when passing through the plane-parallel plate.

It is also preferred that the second sub-region of the coupling element is provided with a reflective layer for the illuminating laser beam. The reflective layer matched to the wavelength of the reflective laser beam allows for a desired redirection of the illuminating laser beam by reflection.

It is further preferred that the reflective layer is transparent to the effective laser beam. This ensures that even the low-power-density regions of the effective laser beam still contribute to the irradiation of the target and at the same time prevents effective laser radiation from being reflected there and subsequently vagabonding in the laser beam device in an undesirable manner.

Another preferred embodiment is characterized by the fact that at least the first sub-region is provided with an anti-reflective layer for the effective laser beam. This design also contributes to the advantages mentioned in the previous paragraph.

Optionally, the means for generating the illuminating laser beam may comprise an axicon lens, which is designed and arranged to generate a coherent illuminating laser beam bundle having a circular beam cross section to an illuminating laser beam having an annular laser beam bundle cross section.

Only the outer sub-region of the coupling element is illuminated by an annular illuminating laser beam. This concentrates the illuminating laser beam on the sub-region where the deflecting reflection takes place. In the far field, this results in an intensity distribution with a maximum on the optical axis. The intensity distribution makes it possible to generate a nearly diffraction-limited central intensity spot. When suitably selecting the parameters, this spot can be smaller than the effective laser beam. As a result, the effective laser beam can be finely aligned very precisely with the target or part of the target.

It is further preferred that, as a first alternative, the illuminating laser beam is generated as a sum of coherently coupled partial illuminating laser beams which are arranged around the beam direction of the effective laser beam via the coupling element and aligned in parallel with the effective laser beam.

A second alternative embodiment is characterized in that the illuminating laser beam is generated as the sum of non-coherently coupled partial illuminating laser beams. The reflective layers are preferably limited to the region of the illuminating beams. When using non-coherent partial illuminating laser beams, the circular second sub-region can also be replaced by individual small reflectors. In extreme cases, it could also be possible to work with only one illuminating laser beam.

It is also preferred that the partial illuminating laser beams are arranged concentrically and symmetrically around the effective laser beam.

It is further preferred that the means for generating the illuminating laser beam are designed to generate an intensity distribution with a maximum on an optical axis of the laser beam device in the far field of the illuminating laser beam emitted by the laser beam device.

As a result, the target reflects part of the illuminating laser radiation back along the optical axis so that the reflected illuminating laser radiation is transmitted by the coupling element along the optical axis of the coupling element. The transmission losses occurring at the edge of the coupling element are small because most of the reflected illuminating laser radiation is concentrated near the optical axis.

In another preferred embodiment, the means for generating the illuminating laser beam are designed to generate the illuminating laser beam as a continuous wave laser beam.

It is also preferred that the means for generating the illuminating laser beam are designed to generate the illuminating laser beam as a pulsed laser beam. An alternating, or pulsed, operation can reduce the average power in the individual illuminating lasers while maintaining the same average power/same average intensity and the same peak intensity in the target plane. Advantageously, this can reduce the NOHD (nominal ocular hazard distance), i.e., the hazard region within which eye damage can occur when looking directly into the laser beam, as is also the case when using a plurality of non-coherent means to generate the illuminating laser radiation. As long as the beams do not yet overlap, this also applies to coherent radiation.

Further advantages are described in the dependent claims, the description and the accompanying figures.

It is understood that the above features and those to be explained below can be used not only in the combination indicated in each case but also in other combinations or on their own, without departing from the scope of the present invention.

Embodiments of the invention are shown in the drawings and explained in more detail in the following description. In this context, the same reference signs in different figures refer to the same elements or elements that are at least comparable in terms of their function. The figures show the following in a schematic form:

BRIEF DESCRIPTION OF DRAWINGS

FIG. 1 a laser beam device together with a mechanical aiming device;

FIG. 2 a coupling element from FIG. 1 together with outgoing and reflected illuminating laser radiation in a side view;

FIG. 3 the coupling element from FIGS. 1 and 2 in a front view;

FIG. 4 a lateral cross section of the coupling element together with intensity curves of an effective laser beam and an illuminating laser beam;

FIG. 5 a front view of an arrangement of four partial illuminating laser beams together with the two sub-regions of the coupling element;

FIG. 6 an intensity distribution example;

FIG. 7 an overlap of a first partial illuminating laser beam and a second partial illuminating laser beam;

FIG. 8 an alignment of a first partial illuminating laser beam and a second partial illuminating laser beam;

DETAILED DESCRIPTION

Figure 9:
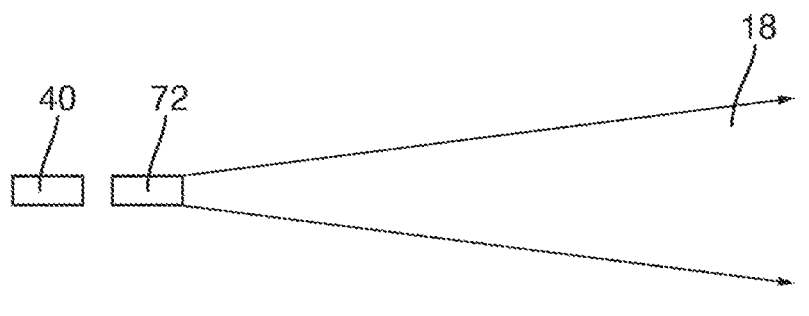
FIG. 9 a possible arrangement for generating an illuminating laser beam from an illuminating laser beam source and a telescope.

Specifically, FIG. 1 shows a laser beam device 10 together with a mechanical aiming device 12. The laser beam device 10 is arranged inside a housing 14. The housing has an aperture 16, through which an illuminating laser beam and an effective laser beam 20 can exit the housing 14. In this embodiment, the mechanical aiming device 12 comprises a rotating platform 22 and a pivot axis 24 that is rigidly connected to the housing 14 and pivotally mounted in the rotating platform 22. The rotating platform 22 is rotatable about a rotational axis 26. By rotating the rotating platform 22 about the rotational axis 26 and pivoting the housing 14 about the pivot axis 24, the laser radiation exiting the aperture 16 can be roughly aligned with a target 28. The rough alignment is controlled by a radar system, for example. The coupling can occur between elements 34 and 16 and is particularly preferably between elements 38 and 16.

The laser beam device 10 comprises means for generating an effective laser beam 20 originating from the laser beam device 10, means for generating an illuminating laser beam 18, and a coupling element 30 for coupling the illuminating laser beam 18 into a beam path of the effective laser beam 20 to be emitted by the laser beam device 10. The means for generating the effective laser beam 20 comprise a high-energy laser 32, a deflection mirror 34 that is reflective for the wavelength of the effective laser beam 20 and transmissive for the wavelength of the illuminating laser beam 18, a tip-tilt mirror 36 that can be controlled with regard to its orientation, an effective laser telescope 38, and the coupling element 30.

The means for generating an illuminating laser beam 18 comprise an illuminating laser 40 and the coupling element 30. The illuminating laser beam 18 is coupled into the beam path of the effective laser beam 20 by the coupling element 30. The illuminating laser radiation preferably has a different wavelength than the effective laser radiation.

The means for generating the illuminating laser beam 18 are designed to generate the illuminating laser beam 18 as a continuous wave laser beam. Alternatively, the means for generating the illuminating laser beam 18 are designed to (repeatedly) generate the illuminating laser beam 18 as a pulsed laser beam.

The means for generating the illuminating laser beam 18 comprise, for example, an axicon lens, which is designed and arranged to convert an illuminating laser beam bundle having a circular beam cross section into an illuminating laser beam bundle having an annular laser beam bundle cross section. Alternatively, a coherent circular power distribution in the illuminating laser beam 18 can be generated by using an unstable resonator arrangement.

The illuminating laser beam 18 coupled into the beam path of the effective laser beam 20 exits the housing 14 through the aperture 16 and detects the target 28 if the rough alignment is correct. The illuminating laser radiation 42 reflected from the target 28 propagates closely along the optical axis 44 of the coupling element 30, through the coupling element 30 and the effective laser radiation telescope 38, and via the tip-tilt mirror 36 to the deflection mirror 34, which is reflective for the wavelength of the effective laser beam 20 and transmissive for the wavelength of the illuminating laser beam and the reflected illuminating laser radiation 42. The reflected illuminating laser radiation 42 passes through the deflection mirror 34 and is detected by the optical sensor 46. The signal of the optical sensor 46 generated in this manner is evaluated by evaluation software 48 of a control unit 50, and the result of the evaluation is used by a drive unit 52 of the control unit 50 to drive the tip-tilt mirror 36. The driving is such that the tip-tilt mirror 36 directs any triggered effective laser beam 20 toward the target 28. This alignment represents fine tracking.

FIG. 2 shows the coupling element 30 from FIG. 1 together with outgoing 18 and reflected illuminating laser radiation 42 in a side view. FIG. 3 shows the coupling element 30 from FIGS. 1 and 2 in a front view, i.e., what it could look like for an observer on the target side on the optical axis 44. The coupling element is preferably circular and appears as an elliptical shape in FIG. 3 due to an orientation inclined to the optical axis 44.

In each of the embodiments shown in the figures, the coupling element 30 is a circular plane-parallel plate. When installed at 45°, the plate is preferably elliptical such that its projection in the incident and outgoing directions is circular. The coupling element 30 comprises a first sub-region 54 and a second sub-region 56 that is different from the first sub-region 54. The means for generating the effective laser beam 20, the means for generating the illuminating laser beam 18 and the coupling element 30 are arranged relative to each other such that the effective laser beam 20 is directed onto the first sub-region 54 and the illuminating laser beam 18 is directed onto the second sub-region 56. The arrangement shown in FIG. 1 corresponds to this requirement.

FIG. 4 shows a lateral cross section of the coupling element 30 together with intensity curves of an effective laser beam and an illuminating laser beam. In this illustration, the optical axis of the coupling element lies within the drawing plane.

The first sub-region 54 is a central sub-region 54 with regard to the beam cross section of the effective laser beam 20. The first sub-region 54 is transparent to the effective laser beam 20 and the illuminating laser beam 42, and the second sub-region 56 is designed to reflect the illuminating laser beam 18 in parallel with the effective laser beam 20.

At least the first sub-region 54 is provided with an anti-reflective layer 58 for the effective laser beam 20. The anti-reflective layer 58 can be arranged on the front side and/or on the back side of the coupling element 30. Preferably, the first sub-region 54 is coated with the anti-reflective layer 58 as well. Optionally, the sub-region 54 comprises an AR layer for the illuminating laser beam on both sides.

With respect to the beam cross section of the effective laser beam 20, the second sub-region 56 is a peripheral sub-region located outside the central (first) sub-region 54.

The second sub-region 56 of the coupling element 30 is provided with a reflective layer 60 for the illuminating laser beam 18. Preferably, the reflective layer 60 is transparent to the effective laser beam 20. Dielectric coatings that can be selected according to the wavelengths and the desired reflectance and transmittance constitute prior art. The curve 62 shows a schematic example of the Gaussian-curve-shaped intensity curve of the effective laser beam 20 after the coupling element 30, which is at its maximum in the central sub-region 54 and is not yet zero even in the peripheral sub-regions 56. The curves 64 represent intensity curves of the illuminating laser beam 18 reflected in the peripheral region 56.

FIG. 5 shows a front view of an arrangement of four partial illuminating laser beams together with the two sub-regions of the coupling element. The partial illuminating laser beams are arranged concentrically and symmetrically around the effective laser beam (not shown here).

The sum of these partial illuminating laser beams 66, if they are coherently coupled partial illuminating laser beams 66, then produces an intensity distribution in the far field with an intensity maximum on the optical axis of the laser beam device 10. The optical axis of the laser beam device 10 generally coincides with the optical axis of the coupling module 30, at least outside the laser beam device 10. FIG. 6 shows an example of such an intensity distribution.

When using non-coherently coupled partial illuminating laser beams, the coupling element having circular or annular sub-regions can also be replaced by individual, smaller coupling elements in the form of reflectors. The non-coherently coupled partial illuminating laser beams can be aligned to overlap in the target area to increase the illumination intensity in the target area.

FIG. 7 shows such an overlap of a first partial illuminating laser beam 68, or partial illuminating laser beam bundle, and a second partial illuminating laser beam 70, or partial illuminating laser beam bundle.

Alternatively, the non-coherently coupled partial illuminating laser beams can be aligned so as to illuminate adjacent areas in the target area that are in contact with each other, thus illuminating a larger overall area.

FIG. 8 shows such an alignment of a first partial illuminating laser beam 68, or partial illuminating laser beam bundle, and a second partial illuminating laser beam 70, or partial illuminating laser beam bundle.

By distributing the power transported by the illuminating laser beam 18 to at least two partial illuminating laser beams 68, 70, the transmission power otherwise required when using a single illuminating laser beam 18 is nearly halved. If the aperture angle (FIG. 8) is increased, the requirements for the means for generating the illuminating laser beam in terms of power and beam quality are reduced for a given aperture diameter. Reducing the power and increasing the aperture angle preferably reduces the NOHD for the individual partial illuminating laser beam when using a plurality of partial illuminating laser beams. If the area of overlap is above the NOHD for the individual partial illuminating laser beam, then the NOHD for the entire laser beam device is reduced as well.

Means that generate a pulsed illuminating laser beam can also be used instead of means that generate a continuous wave illuminating laser beam. An alternating, or pulsed, operation can reduce the average power in the individual partial illuminating laser beams while maintaining the same average power/same average intensity and the same peak intensity in the target plane. Advantageously, this can reduce the NOHD, as is also the case when using a plurality of non-coherent means for generating illuminating laser radiation.

FIG. 9 shows a possible arrangement for generating an illuminating laser beam 18 from an illuminating laser 40 and an illuminating laser telescope 72. Here, the aperture angle of the illuminating laser beam 18 is relatively small and the NOHD is correspondingly relatively large. Analogously, the NOHD is relatively small at peak power and relatively large on average.

Figure 10:
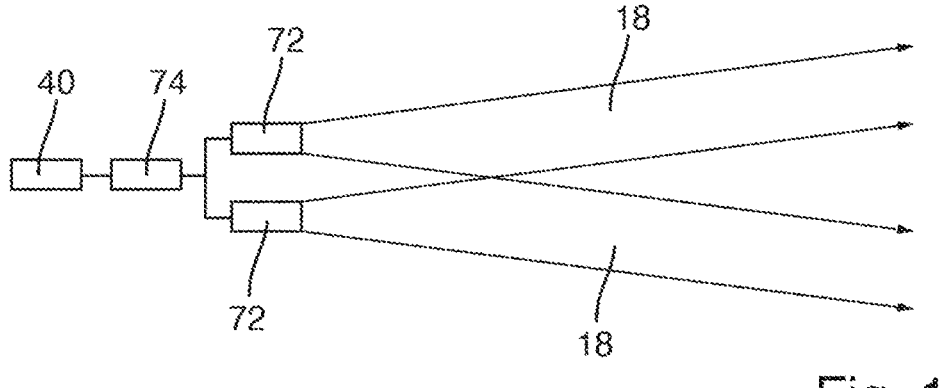
FIG. 10 a possible arrangement for generating two illuminating laser beams from an illuminating laser beam source and a beam switch.

FIG. 10 shows a possible arrangement for generating two illuminating laser beams 18 from an illuminating laser 40, a beam switch 74 and two illuminating laser telescopes 72. An advantage of this arrangement is that only one laser is required, which reduces cost, mass, and the required installation space.

It is also possible to completely reverse the arrangement of the effective laser beam and the illuminating laser beam. In this case, the effective laser beam is reflected and the illuminating laser beam is transmitted. This design can have advantages in terms of losses.

Figure 11:
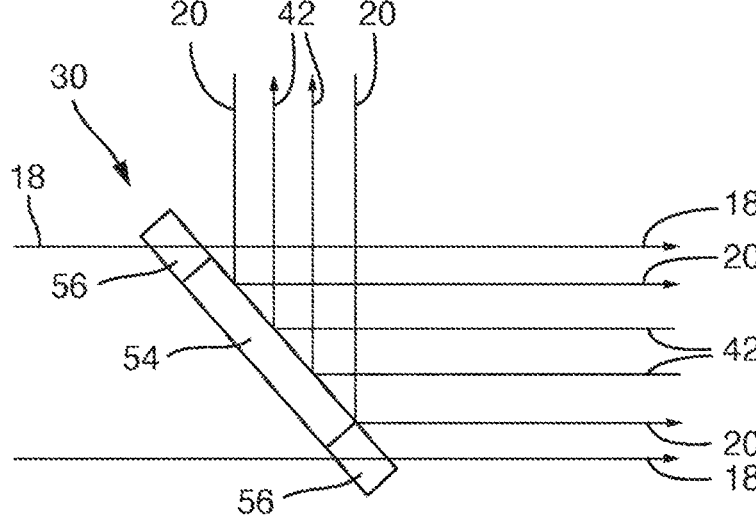
FIG. 11 beam paths of a laser beam device 10 with such an arrangement.

FIG. 11 shows beam paths of a laser beam device 10 with such an arrangement. Such a laser beam device 10 comprises means for generating an effective laser beam 20 originating from the laser beam device 10, means for generating an illuminating laser beam 18, and a coupling element 30 for coupling the illuminating laser beam 18 into a beam path of the effective laser beam 20 to be emitted by the laser beam device 10. This laser beam device is characterized in that the coupling element has a first sub-region and a second sub-region 56 that is different from the first sub-region 54 and in that the means for generating the effective laser beam 20, the means for generating the illuminating laser beam 18, and the coupling element 30 are arranged relative to each other such that the effective laser beam 20 is directed onto the first sub-region 54 and the illuminating laser beam 18 is directed onto the second sub-region 56, the second sub-region 56 being transparent to the illuminating laser beam 18 and the first sub-region 54 being designed to reflect the effective laser beam 20 in parallel with the illuminating laser beam 18.

Figure 12:
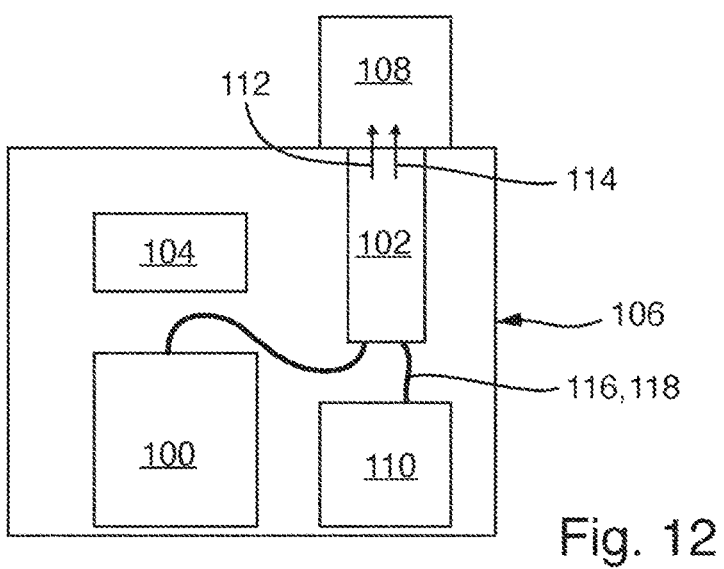
FIG. 12 a block diagram of a rough structure of a high laser or a laser weapon.

FIG. 12 shows a schematic block diagram representation of at least one effective laser source with the reference sign 100 as well as at least one beam-guiding module 102 and at least one controller 104. These assemblies are components of, for example, a high-power laser, in this case a laser weapon (or laser weapon system).

The effective laser source 100, the beam-guiding module 102, and the controller 104 can be housed together in a stationary or semi-mobile portion 106 of the high-power laser. The stationary/semi-mobile portion 106 can be formed by a space, for example a container, etc.

An aiming unit 108 (here a beam deflection system), a so-called scanner, is arranged outside the container.

In a preferred embodiment, an illuminating laser source with the reference sign 110 is likewise housed in this container. This has the advantage that a laser beam 112 from the illuminating laser source 110 can be coupled into the beam-guiding module 102, which means that the illuminating laser does not need such a beam-guiding module. The coupling can be realized for example via a dichroic mirror (not shown in detail). The illuminating laser may further utilize a telescope of the beam-guiding module 102. Alternatively, the illuminating laser 110 may be mounted on the aiming unit 108. In that case, the illuminating laser beam 112 may be aligned with, i.e., point in the direction of, the laser beam 114 of the effective laser source.

The at least one effective laser source as well as the at least one illuminating laser source 110 are functionally connected to the at least one beam-guiding module 102, for example via at least one optical fiber 116 (transport fiber) and/or at least one free beam 118.

The electrical controller 104 can act on at least the beam-guiding module 102 as well as the aiming unit 108, depending on the specification and/or in response to an evaluation of the operation of the laser weapon (not explained in further detail).

Figure 13:
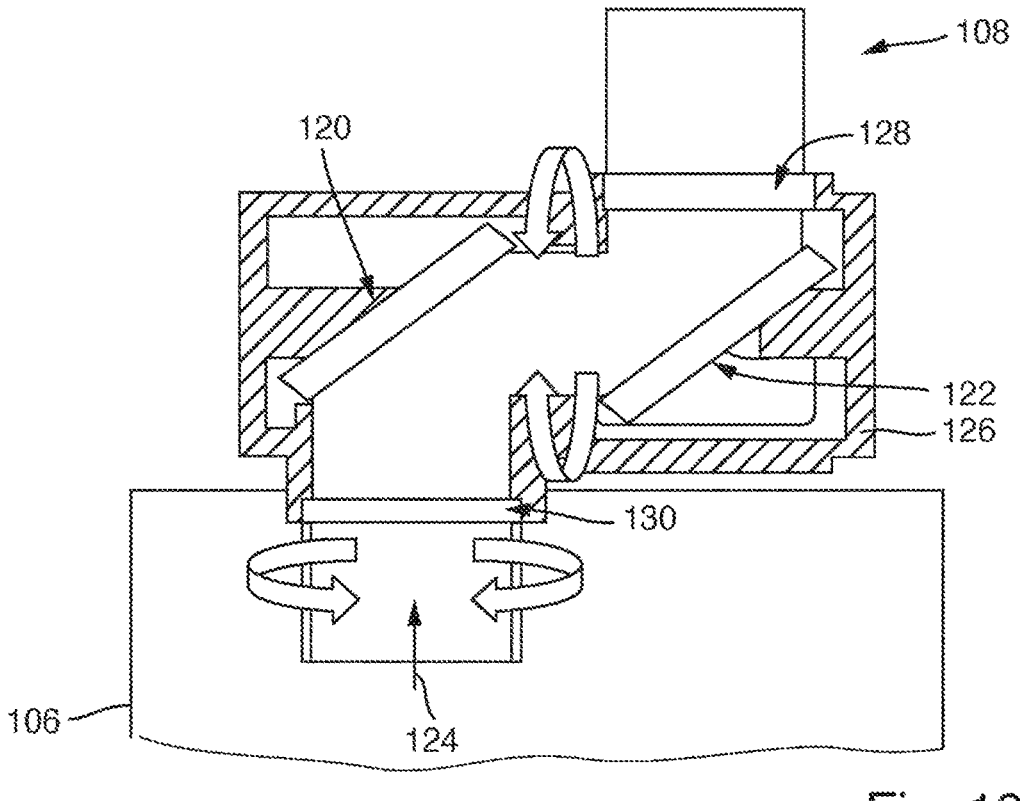
FIG. 13 a representation of the aiming unit from FIG. 12.
Figure 14:
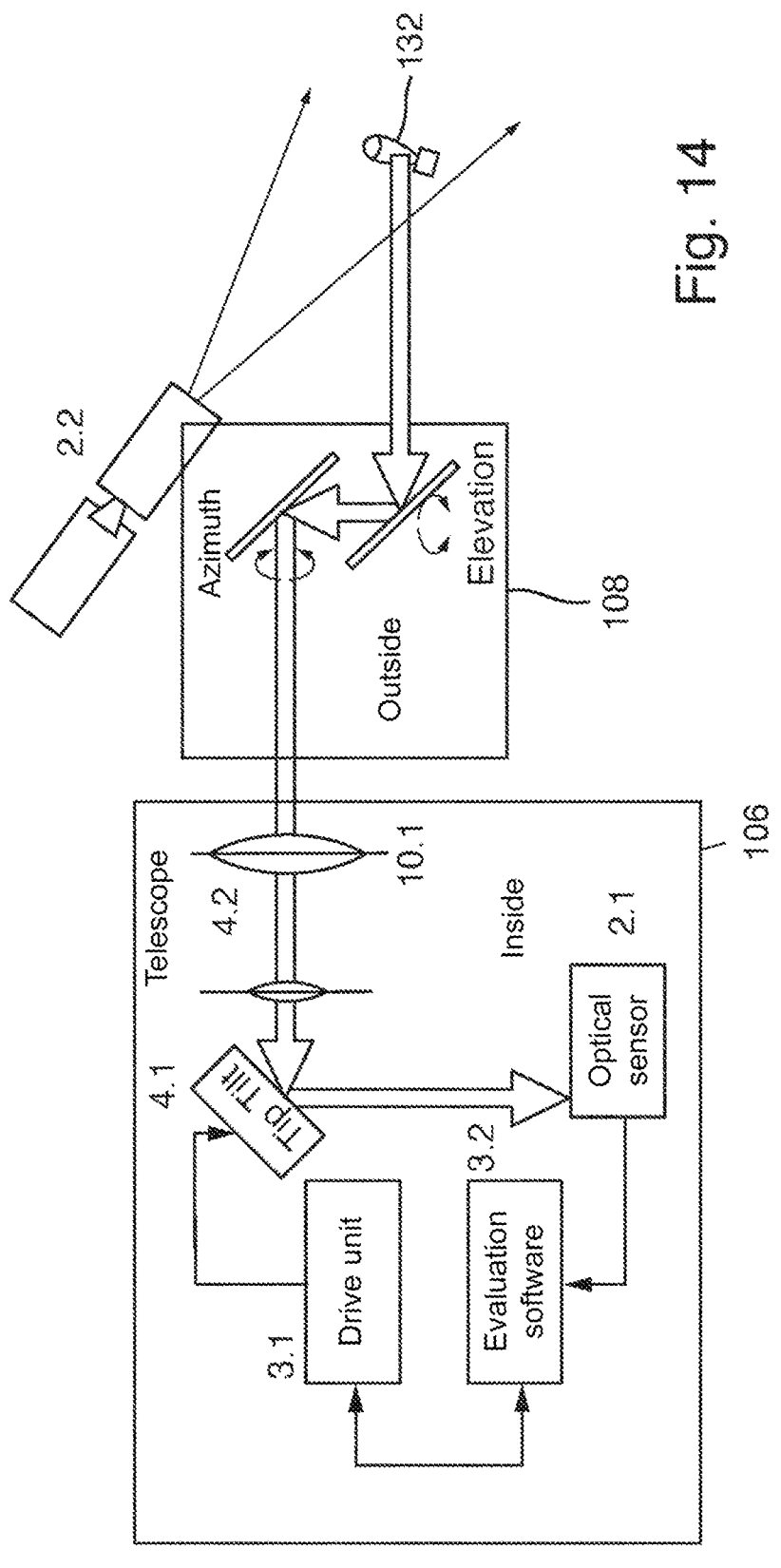
FIG. 14 a partial representation of the laser weapon with an aiming unit.

FIG. 13 is a slightly enlarged view of the aiming unit 108. The aiming unit 108 comprises two deflection mirrors 120, 122 on rotational axes (azimuth, elevation). The two rotational axes are configured in such a way that the full deflection angle range (0-360°) can be set in the azimuth, with any number of rotations. Connected to each of the rotational axes is a small electric motor (not shown in more detail) by means of which the deflection mirrors 120, 122 can be rotated. The rotation is such that the deflection mirror 122 is rotated along with the deflection mirror 120 so that a laser beam 124 remains centered (in the middle) on the deflection mirror 122. The sign 126 refers to a housing of the aiming unit 108.

The aiming unit 108 comprises a signal output 128 and a signal input 130. The signal output 128 is realized in the form of a termination window. The signal input 130 may also be realized in the form of a termination window. In this case, the signal output 128 of the aiming unit 108 points in the direction of a target 132 (FIG. 3), whereas the signal input 130 points in the direction of the effective laser source or the beam-guiding module 102.

The deflection mirrors 14, 15 are preferably installed in the aiming unit 5 in such a way that no deformation of the mirrors 14, 15 occurs due to the weight or movement (proper motion). This can be achieved, for example, by using an isostatic mirror mount (bipods).

The deflection mirrors 120, 122 should be highly reflective for the wavelength of the laser beam 124 of the effective laser source and the wavelength of the laser beam of the illuminating laser source and the observation wavelengths. This requirement can be achieved by optical polishing or a mirror coating. The deflection mirrors 120, 122 may also be simple plane mirrors, for example.

FIG. 3 shows the functionally essential assemblies in the stationary/semi-mobile portion 106 interacting with the aiming unit 108. These are a control unit 3.1 and evaluation software 3.2 of the controller, an optical sensor 2.1 of the illuminating laser system, as well as an optical component 4.1 and the telescope 4.2 of the beam-guiding module 102. The optical component 4.1 of the beam-guiding module 4 allows for accurate beam deflection for the precise positioning of the laser beam 124 on the target 132. The optical component 4.1 can be a tip-tilt mirror, a movable mirror controllable in two axes (fine tracking).

In this configuration, the illuminating laser itself is not housed in the container. Thus, 2.2 refers to a telescope of the illuminating laser system that, in this representation, is not housed in the stationary/semi-mobile portion (container) along with the laser source 110. There is no difference, however, in terms of functionality. The beam-guiding module 102 further comprises at least one camera (not shown in detail). The observation direction of the at least one camera is the same as the laser beam direction. The camera or cameras should be able to operate in different spectral ranges (observation wavelengths). The at least one camera is used to at least observe the target 132 or the space around the target 132.

The at least one camera can also be used to determine the position of the target 132. Its image evaluation can provide a control signal for the beam deflection.

Furthermore, elements to compensate for atmospheric disturbances can be provided within the beam-guiding module (optional). These are detectors for measuring atmospheric disturbances, such as Shack-Hartmann sensors (wavefront sensor), as well as controllable optical elements for controlling the phase front of the laser beam, such as deformable mirrors.

What is claimed is:

1. A laser beam device comprising means for generating an effective laser beam originating from the laser beam device, means for generating an illuminating laser beam for illuminating and fine tracking a target, and comprising a coupling element for coupling the illuminating laser beam into a beam path of the effective laser beam to be emitted by the laser beam device, wherein the coupling element has a first sub-region and a second sub-region which is different from the first sub-region, wherein the means for generating the effective laser beam, the means for generating the illuminating laser beam and the coupling element are arranged relative to one another so that the effective laser beam is directed onto the first sub-region and the illuminating laser beam is directed onto the second sub-region, wherein the first sub-region is transparent to the effective laser beam and the second sub-region is designed to reflect the illuminating laser beam in parallel with the effective laser beam in the direction of a target, and wherein the coupling element is designed to transmit illuminating laser radiation reflected from the target.

2. The laser beam device according to claim 1, wherein the wavelength of the effective laser beam differs from the wavelength of the illuminating laser beam.

3. The laser beam device according to claim 1, wherein the first sub-region is a central sub-region with regard to the beam cross section of the effective laser beam.

4. The laser beam device according to claim 3, wherein the second sub-region is a peripheral sub-region, located outside of the central sub-region, with regard to the beam cross section of the effective laser beam.

5. The laser beam device according to claim 1, wherein the coupling element is a plane-parallel plate.

6. The laser beam device according to claim 1, wherein the second sub-region of the coupling element is provided with a reflective layer for the illuminating laser beam.

7. The laser beam device according to claim 6, wherein the reflective layer is transparent to the effective laser beam.

8. The laser beam device according to claim 5, wherein at least the first sub-region is provided with an anti-reflective layer for the effective laser beam.

9. The laser beam device according to claim 1, wherein the means for generating the illuminating laser beam comprise an axicon lens, which is designed and arranged to convert an illuminating laser beam bundle having a circular beam cross section into an illuminating laser beam bundle having an annular laser beam bundle cross section.

10. The laser beam device according to claim 1, wherein the illuminating laser beam is generated as a sum of coherently coupled partial illuminating laser beams.

11. The laser beam device according to claim 1, wherein the illuminating laser beam is generated as a sum of non-coherently coupled partial illuminating laser beams.

12. The laser beam device according to claim 10, wherein the partial illuminating laser beams are arranged concentrically and symmetrically around the effective laser beam and in particular around the first sub-region.

13. The laser beam device according to claim 1, wherein the means for generating the illuminating laser beam are designed to generate an intensity distribution with a maximum on an optical axis of the laser beam device in the far field of the illuminating laser beam emitted by the laser beam device.

14. The laser beam device according to claim 1, characterized in that the means for generating the illuminating laser beam are designed to generate the illuminating laser beam as a continuous wave laser beam.

15. The laser beam device according to claim 1, wherein the means for generating the illuminating laser beam are designed to generate the illuminating laser beam as a pulsed laser beam.

16. A laser beam device comprising means for generating an effective laser beam originating from the laser beam device, means for generating an illuminating laser beam for illuminating and fine tracking a target, and a coupling element for coupling the illuminating laser beam into a beam path of the effective laser beam to be emitted by the laser beam device, wherein the coupling element has a first sub-region and a second sub-region which is different from the first sub-region, wherein the means for generating the effective laser beam, the means for generating the illuminating laser beam and the coupling element are arranged relative to one another so that the effective laser beam is directed onto the first sub-region and the illuminating laser beam is directed onto the second sub-region, and wherein the second sub-region is transparent to the illuminating laser beam and the first sub-region is designed to reflect the effective laser beam in parallel with the illuminating laser beam.

* * * * *